Dec. 6, 1949     C. K. BROWN     2,490,507
LIVE BAIT CONTAINER
Filed Sept. 18, 1946
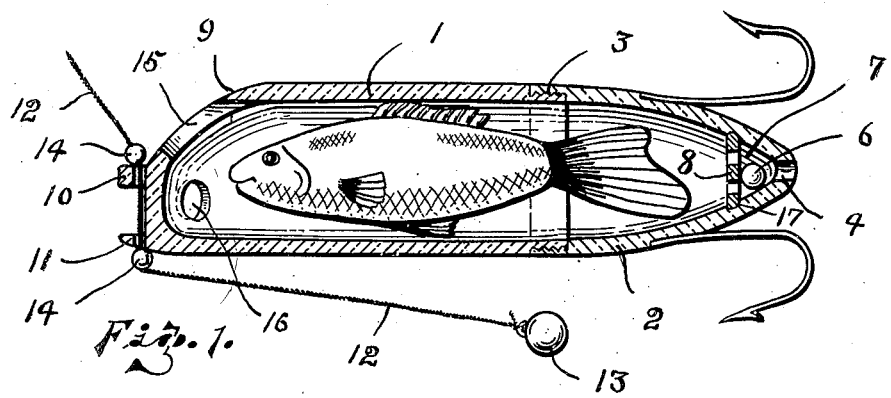
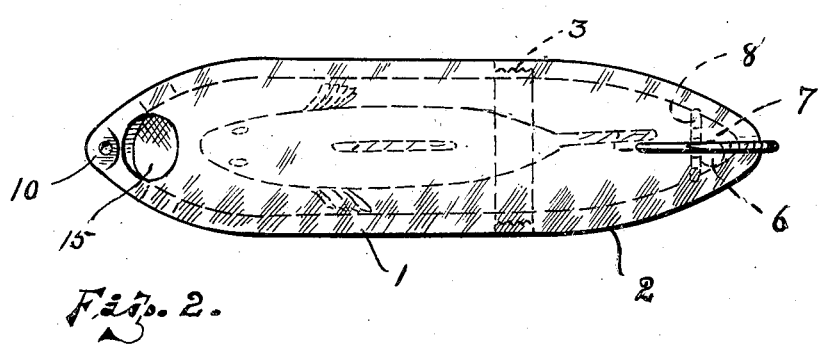
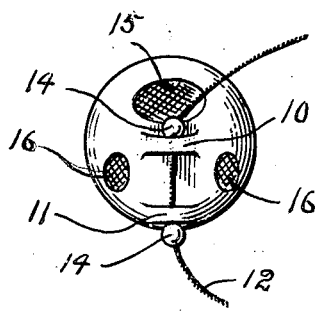
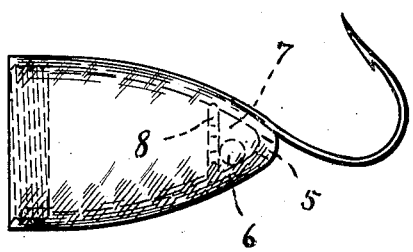
INVENTOR
Clifford K. Brown.
BY Geo. Stevens
ATTORNEY.

Patented Dec. 6, 1949

2,490,507

UNITED STATES PATENT OFFICE 2,490,507

LIVE BAIT CONTAINER

Clifford Kenneth Brown, Duluth, Minn.

Application September 18, 1946, Serial No. 697,790

3 Claims. (Cl. 43—41)

This invention relates to fishing lures and has special reference to a transparent container for carrying live bait therewithin.

One of the principal objects is to provide a practical readily adjustable bait container for fishing with different types or groups of hooks as necessitated by different State or other locality laws.

Another object is to provide such a container that is automatically biased toward horizontal position when the vertical portion of the line upon which it is suspended is properly weighted either adjacent or remote below same.

Another object is to provide such a live bait container having means to automatically prevent its exhaustion when temporarily taken out of the water during the removal of a catch, adjustment of sinkers or the like.

Still another object is to provide such a container that may function equally well for either still fishing or trolling.

Referring now to the accompanying drawing forming part of this application:

Fig. 1 is a central vertical sectional view longitudinally of the container.

Fig. 2 is a top plan view of the container.

Fig. 3 is a front elevational view of Fig. 2.

Fig. 4 is a side elevational view of a slightly modified form of hook carrying after portion of the container.

The numeral 1 represents the body portion of the container which is transparent and of any suitable material and thickness for the purpose intended.

This body portion is preferably cylindrical in cross-section converging on all sides throughout its after end as at 2 and which after end may carry one or more hooks as shown or some other arrangement of catching means without departing from the spirit of the invention.

The after end 2 is further deemed novel in that it is internally screw-threadedly attached to the body 1 as at 3 and each body when sold may have accompanying it a plurality of after portions each with a different or similar arrangement of hooks for selective use as above mentioned.

The rear terminus of each after end portion is provided with an ejection orifice 4 as in Fig. 1 or 5 as in Fig. 4, and in both illustrations such orifice or valve opening is controlled by a simple ball valve 6 within the chamber 7 about each of said orifices.

The chamber 7 is formed by the interior walls of the after end 2 and a pervious resilient disc 8 transverse the hollow portion of the after end 2 of the container and just forwardly of the orifice sufficient to form said chamber with ample room for the ball valve 6 to materially fall away from action as a closure for the discharge orifice when the container is in any position other than substantially vertical. This provides a simple automatic means for retaining what water may be in the container when it is removed from that being fished in.

In this manner the life of the bait may be prolonged even after experiencing a number of catches, and at the same time said valve arrangement functions as adequate drainage means to prevent stagnation of water within the container when in action within the water as obviously the ball 6 will roll away from the orifice at every opportunity except of course, when the container is right end up to prevent same.

As a matter of simplicity the disc 8 is designed to be sprung into a suitably shaped annular groove 17 spaced inwardly from the extreme end of the interior of the container.

From the extreme forward or blunter end, the container is tapered off arcuately and upwardly as at 9 from slightly above the axis of the body and from which point and slightly below the same projects the perforated upper lug or eyelet 10, it having spaced therebelow and aligned therewith the somewhat similar eyelet 11, through the both of which the fishing line 12 is rove.

In the position shown in Fig. 1, the container is found admirable for trolling and an auxiliary adjustable sinker 13 may or may not be used to assist in maintaining a substantially vertical portion of the fishing line intermediate of the eyelets 10 and 11 so as to hold the container in such horizontal position or modifications thereof as may be desired.

The relatively small ball-like split sinkers 14—14 may apparently be adjusted or positioned as desired longitudinally of the fishing line for the type of fishing being practiced, or in relation to the heavier sinker 13 when still fishing.

In a container of this kind wherein provision is made for sustaining the life of the bait temporarily when out of the water it is apparent that the openings to the interior thereof other than the outlet 4 are necessarily through the opposite end of the container and one arrangement of which is clearly illustrated as at 15 and 16.

Having thus described my invention, what I claim is:

1. A live bait container comprising a two-part separable transparent container screw-threadedly united, the fore portion of said container characterized by having openings leading into the interior thereof, a pervious wall installed within and across the rear end of the after portion of said container forming a small chamber adjacent the rear end of said after portion, said chamber having an orifice leading exteriorly thereof, and a valve within said chamber for automatically closing said orifice when said lure is in vertical position.

2. A live bait container of the type described comprising a two-part separable body portion screw-threadedly united characterized by the forward section thereof having line attaching means and openings through the body portion, and the after hook carrying section of said body having a chamber therein formed by the interior walls of said after section and a pervious resilient disc sprung into an annular groove in the interior thereof, said chamber having an orifice leading exteriorly of said after section and a ball valve for automatically closing said orifice.

3. A transparent live bait container for fishing comprising a two-part separable body, the after section of said body having a chamber formed by means of a removable pervious disc and the interior walls of said after section, an orifice leading externally of said section from said chamber, and a valve within said chamber whereby when said container is in a horizontal position said orifice is open to permit of the flow of water therethrough and when said container is in a vertical position said valve closes said orifice so as to keep any water within said container therewithin.

CLIFFORD KENNETH BROWN.

REFERENCES CITED

The following references are of record in the file of this patent:

UNITED STATES PATENTS

| Number | Name | Date |
|---|---|---|
| 389,615 | Townsend | Sept. 18, 1888 |
| 473,503 | Herring | Apr. 26, 1892 |
| 1,419,540 | Brown | June 13, 1922 |
| 2,081,671 | Lauer | May 25, 1937 |
| 2,112,385 | Smith | Mar. 29, 1938 |
| 2,237,534 | Van der Clute | Apr. 8, 1941 |
| 2,329,790 | Seigle | Sept. 21, 1943 |